United States Patent [19]

An

[11] Patent Number: 5,243,432
[45] Date of Patent: Sep. 7, 1993

[54] CIRCUIT FOR CONTROLLING SHUTTER SPEED IN ACCORDANCE WITH THE MOTION OF THE OBJECT PHOTOGRAPHED

[75] Inventor: Byung E. An, Seoul, Rep. of Korea

[73] Assignee: Samsung Electronics Co., Ltd., Rep. of Korea

[21] Appl. No.: 829,438

[22] Filed: Feb. 3, 1992

[30] Foreign Application Priority Data

Feb. 1, 1991 [KR] Rep. of Korea ............... 91-1917

[51] Int. Cl.[5] .................. H04N 5/14; H04N 5/335
[52] U.S. Cl. ........................ 358/213.19; 358/213.13
[58] Field of Search ............... 358/213.13, 213.19, 358/105, 228, 213.24, 211; 354/430, 435, 458

[56] References Cited

U.S. PATENT DOCUMENTS

| | | | |
|---|---|---|---|
| 4,218,119 | 8/1980 | Schickedanz | 354/430 |
| 4,264,161 | 4/1981 | Hosoe et al. | 358/222 |
| 4,396,950 | 8/1983 | Roth | 358/213.19 |
| 4,531,156 | 7/1985 | Nishizawa et al. | 358/209 |
| 4,689,686 | 8/1987 | Hashimoto et al. | 358/213.26 |
| 5,060,007 | 10/1991 | Egawa | 354/430 |

*Primary Examiner*—Joseph Mancuso
*Assistant Examiner*—Wendy R. Greening
*Attorney, Agent, or Firm*—Sughrue, Mion, Zinn, Macpeak & Seas

[57] ABSTRACT

An automatic shutter speed control circuit for a video camera that includes a pulse generating circuit, a pulse processing circuit and a signal outputting circuit. The pulse generating circuit includes a signal detecting circuit, a first switch, a shaping circuit, a switching control circuit, a second switch, a pulse generating circuit and a combining circuit. The pulse processing circuit includes a signal processing circuit, an error correcting circuit and a third switch. The signal outputting circuit includes a fourth switch and a control signal generating circuit. The pulse generating circuit generates a single pulse train per field representative of the object's speed. The output circuit generates a control signal based on the pulse train to control shutter speed.

9 Claims, 4 Drawing Sheets

FIG. 1
PRIOR ART
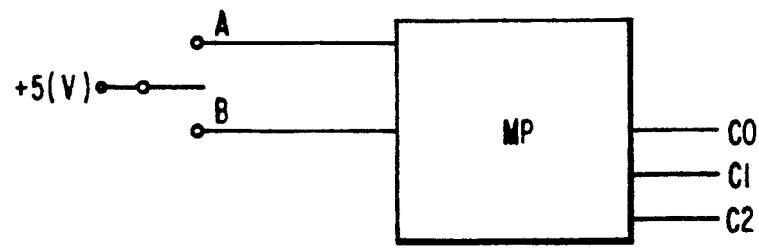
FIG. 3(a)
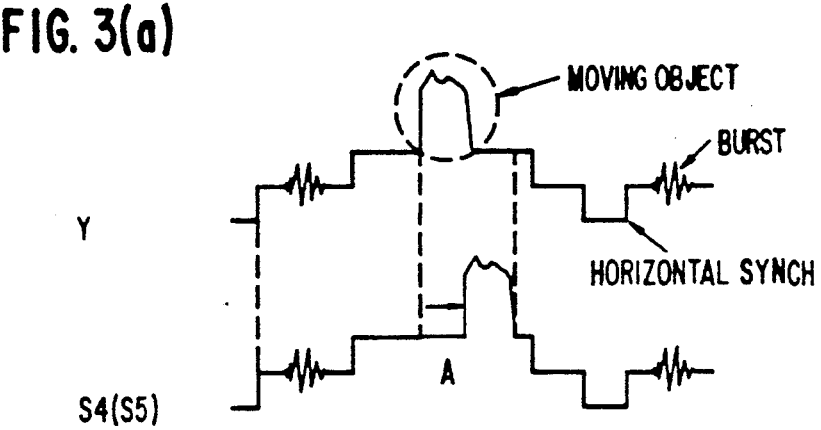
FIG. 3(b)
FIG. 3(c)
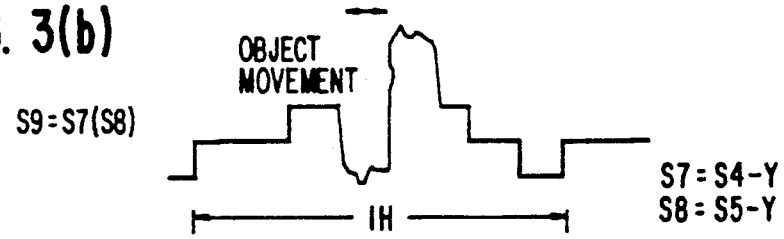
FIG. 3(d)
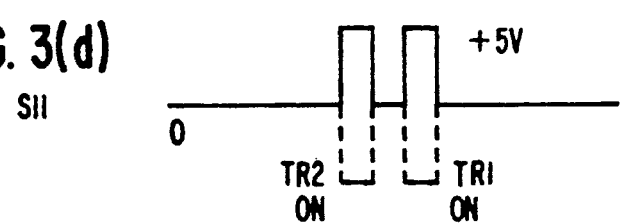

CIRCUIT FOR CONTROLLING SHUTTER SPEED IN ACCORDANCE WITH THE MOTION OF THE OBJECT PHOTOGRAPHED

FIELD OF THE INVENTION

The present invention relates to a video camera in which the functions of a video tape recorder and camera are combined together, and particularly to an automatic shutter speed control circuit for a video camera, in which the shutter speed is automatically controlled in accordance with the motions of the object to be photographed.

BACKGROUND OF THE INVENTION

Conventionally, as shown in FIG. 1, output signals from a microprocessor MP are varied in accordance with the contact state of a switch SW1, and, under this condition, the shutter speed is controlled in accordance with the output signals. That is, if the switch SW1 is connected to a terminal A, the microprocessor MP outputs signals for increasing the shutter speed, while, if the switch SW1 is connected to a terminal B, then the microprocessor MP outputs signals for decreasing the shutter speed, thereby controlling the shutter speed. Here, the switch SW1 is manually controlled.

In the above described conventional video camera, the shutter speed is manually controlled, and, under this condition, if the speed of the moving object to be photographed is constant, the shutter speed can be easily controlled. However, if the speed of the moving object is not constant and irregular, then it is almost impossible to control the shutter speed.

SUMMARY OF THE INVENTION

The present invention is intended to overcome the above described disadvantages of the conventional techniques.

Therefore it is the object of the present invention to provide an automatic shutter speed control circuit for a video camera, in which the speed of the moving object to be photographed is detected based on the input luminance signals, and the shutter speed is automatically adjusted in accordance with pulse signals which are generated in accordance with the detected luminance signals.

In achieving the above object, the automatic shutter speed control circuit for a video camera including a microprocessor for controlling the shutter speed according to the present invention further includes: a pulse generating means for generating control pulses in order to automatically control the shutter speed by detecting the moving speed of the object based on the input luminance signals according to horizontal synchronizing signals. A pulse processing means is connected to the output side of the pulse generating means, and is controlled to generate only one control pulse while vertical synchronizing signals are input. The pulse processing means is also controlled to correct errors in the number of input control pulses. A signal outputting means is connected to the output side of the pulse processing means in such a manner as to generate signals to control the shutter speed in accordance with the input control pulses.

BRIEF DESCRIPTION OF THE DRAWINGS

The above object and other advantages of the present invention will become more apparent by describing in detail the preferred embodiment of the present invention with reference to the attached drawings in which:

FIG. 1 is a detailed circuit diagram of the conventional video camera shutter speed control circuit;

FIGS. 3(a)-3(j) are timing charts showing the wave patterns of the output signals of the automatic shutter speed control circuit according to the present invention.

DESCRIPTION OF THE PREFERRED EMBODIMENT

Figure 2:
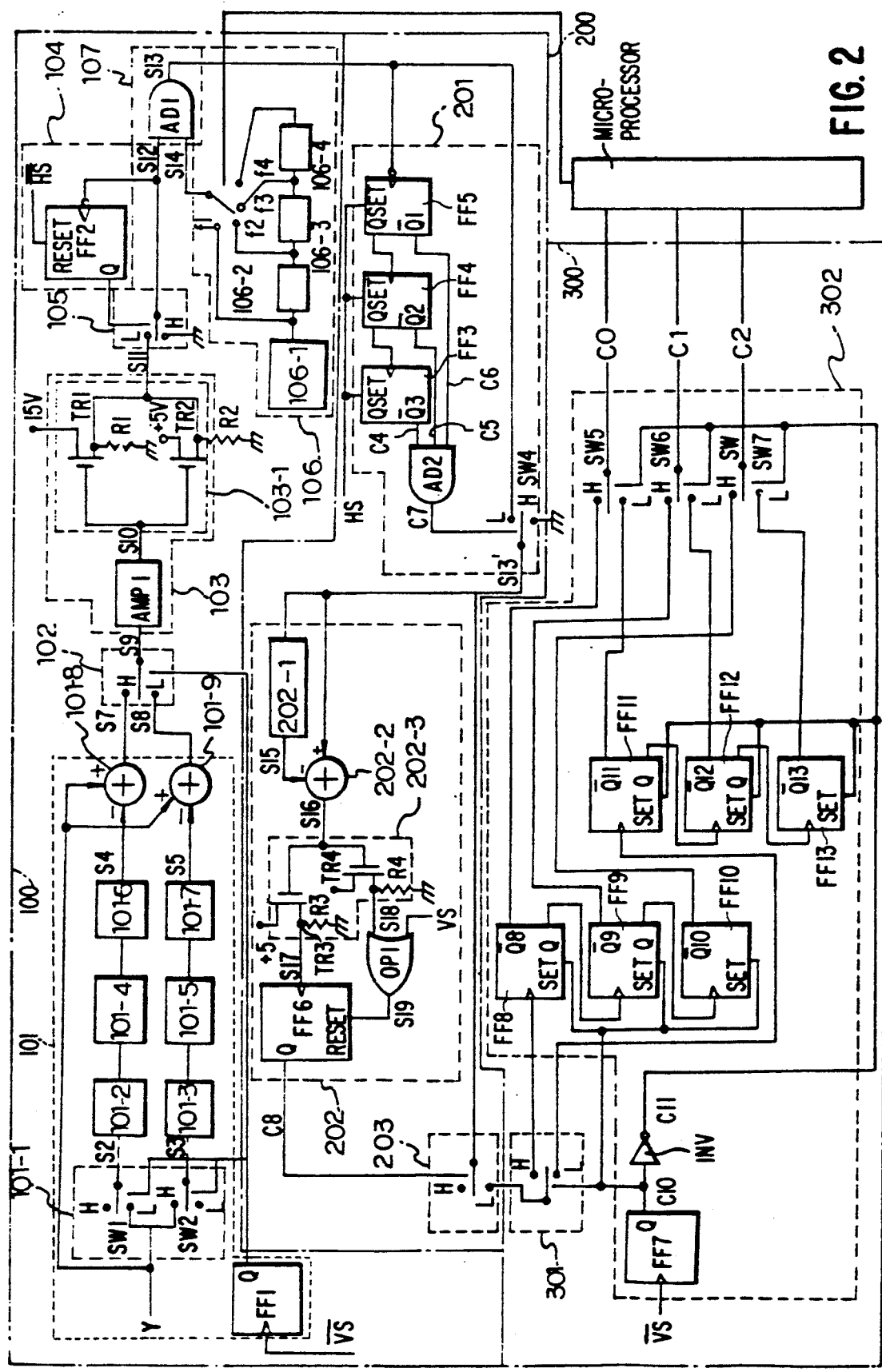
FIG. 2 is a detailed circuit diagram of the automatic shutter speed control circuit for a video camera according to the present invention.

FIG. 2 illustrates in detail the automatic shutter speed control circuit for a video camera according to the present invention. As shown in this drawing, the circuit includes a pulse generating means 100, a pulse processing means 200 and a signal outputting means 300.

The pulse generating means 100 includes a signal detecting circuit 101 for detecting the moving speed of an object (to be photographed) based on input luminance signals Y. A first switch 102 selects one of the output signals of the signal detecting circuit 101 and a signal shaping circuit 103 amplifies and shapes the wave patterns of the output signals of the first switch 102. A switching control circuit 104 and a second switch 105 are controlled in such a manner as to output only the first input signals among the output signals of the signal shaping circuit 103 during a single horizontal synchronizing signal period. A pulse generating circuit 106 generates pulses in order to control the shutter speed and a combining circuit 107 generates shutter speed control pulses after combining the output signals of the pulse generating circuit 106 and the second switch 105.

The pulse processing means 200 includes a signal processing circuit 201 for removing all the pulses, except for the shutter speed control pulses in the output signals of the combining circuit 107, from the pulse generating means 100. An error correcting circuit 202 selects and outputs the maximum value from among the input pulses during 1 V (i.e. one vertical synchronizing period), upon finding a non-correspondence between the output signals of the signal processing circuit 201 and the 1H-delayed (i.e. one horizontal synchronizing period) output pulses of the signal processing circuit 201. A third switch 203 outputs signals provided from the combining circuit 107 of the pulse generating means 100.

The signal outputting means 300 includes a fourth switch 301 for passing the output signals of the third switch 203 of the pulse processing means 200 and a control signal generating circuit 302 for outputting shutter speed control signals C0-C2 while a vertical synchronizing pulse is input.

The constitution of the above components will be described in further detail below. That is, a switching section 101-1 of the signal generating circuit 101 is connected to and controlled in accordance with the output signals of a flip flop FF1 of the signal generating circuit 101 from which high signals are generated, wherein the switching section 101-1 consists of two switches SW1,SW2. Analogue/digital converters 101-2,101-3 of the signal generating circuit 101, which convert the analogue luminance signals Y to digital signals, are connected to the respective output sides of the switches SW1,SW2 of the switching section 101-1. Delays 101-4,101-5 of the signal generating circuit 101, which delay the input luminance signals by 1 field (FIG. 3a) connected to the respective output sides of the analogue/digital converters 101-2,101-3.

Further, digital/analogue converters 101-6,101-7 of the signal generating circuit 101, which converts the 1 field delayed luminance signals to analogue signals, are connected to the respective output sides of the delays 101-4,101-5. Adders 101-8,101-9 of the signal generating circuit 101, which output difference signals S7, S8 (FIG. 3b) between the input luminance signals Y and the output signals of the digital/analogue converters 101-6,101-7, are connected to the respective output sides of the digital/analogue converters 101-6,101-7.

The first switch 102, which selects one of output signals S7, S8 in response to the flip flop FF1 of the signal generating circuit 101, is connected to the output sides of the adders 101-8,101-9 of the signal generating circuit 101. An amplifier AMP1 of the signal shaping circuit 103, which amplifies the selected signal to provide signal S10 (FIG. 3c), is connected to the output side of the first switch 102. A shaping section 103-1 of the signal shaping circuit 103, which shapes the amplified signal to form signal S11 (FIG. 3d); is connected to the output side of the amplifier AMP1. The shaping section 103-1 includes two transistors TR1,TR2. The second switch 105 is connected to the output side of the shaping section 103-1.

The switching control circuit 104 comprises a flip flop FF2 which is controlled in accordance with the horizontal synchronizing signals HS. The second switch 105 is controlled in accordance with the output signals of the flip flop FF2.

Frequency dividers 106-2,106-3,106-4 of the pulse generating circuit 106, which frequency-divide the output pulses of an oscillator 106-1, are connected to the output side of the oscillator 106-1 of the pulse generating circuit 106, which generates shutter speed control pulses. A switch SW3 of the pulse generating circuit 106, which makes it possible for the user to select the pulses, is connected to the respective output sides of the frequency- dividers 106-2–106-4 and the oscillator 106-1. An AND gate AD1 of the combining circuit 107, which outputs a high signal upon finding a high level at two input signals, is connected to the output sides of the second switch 105 and the switch SW3 of the pulse generating circuit 106. Flip flops FF3,FF4,FF5 of the signal processing circuit 201, which remove the signals after the inputting of a 9th signal, are connected to the output side of the AND gate AD1.

Another AND gate AD2 of the signal processing circuit 201, which outputs high signals upon finding high levels in all of the input signals, is connected to the respective output sides of the flip flops FF3,FF4,FF5. A switch SW4 of the signal processing circuit 202 is connected to the output side of the AND gate AD2, and is controlled by the output signals of the AND gate AD2, in such a manner that either the output side of the combining circuit 107 or the ground terminal is selected.

A delay 202-1 of the error correcting circuit 202, which delays the signals from the switch SW4 by 1H (FIG. 3b), is connected to the output side of the switch SW4. An adder 202-2 of the error correcting circuit 202, which adds up the delayed signals and the signals passed through the switch SW4, is connected to the output side of the delayer 202-1. A shaper 202-3 of the error correcting circuit 202, which shapes the output signals of the adder 202-2, is connected to the output side of the adder 202-2. The shaper 202-3 includes two transistors TR3,TR4. An OR gate OR1 of the error correcting circuit 202, which outputs a low signal upon finding low levels in both the vertical synchronizing signal VS and in the output signal of the transistor TR4, is connected to the output side of the transistor TR4 of the shaper 202-3 of the error correcting circuit 202. A flip flop FF6 of the error correcting circuit 202, which delays the signals in accordance with the output signals of the OR gate OR1, is connected to the output side of the OR gate OR1. A third switch 203 which is controlled to select the signals passed through the switch SW4 in accordance with the output signals of the flip flop FF6 is connected to the flip flop FF6.

Meanwhile, a fourth switch 301, which controls the signals from the third switch 203 in accordance with the output signals of the flip flop FF7, is connected to the output side of the flip flop FF7 of the control signal generating circuit 302, which delays the input vertical synchronizing signals. Flip flops FF8-FF13 of the control signal generating circuit 302, which output shutter speed control signals in accordance with the output signals of the fourth switch 301, are connected to the output side of the fourth switch 301. These sets of flip flops FF8-FF10, FF11-FF13 are selected by the fourth switch 301, and mutually different control signals are outputted in accordance with the signals of the selected flip flops FF8-FF13. Selecting switches SW5,SW6,SW7 of the control signal generating circuit 302, which are controlled to pass the output signals of the flip flops FF8-FF13, are connected to the respective output sides of the flip flops FF8-FF13. Further, an inverter gate INV of the control signal generating circuit 302, which outputs control signals in order to control the selecting switches SW5,SW6,SW7, is connected to the output side of the flip flop FF7.

Figure 3E:
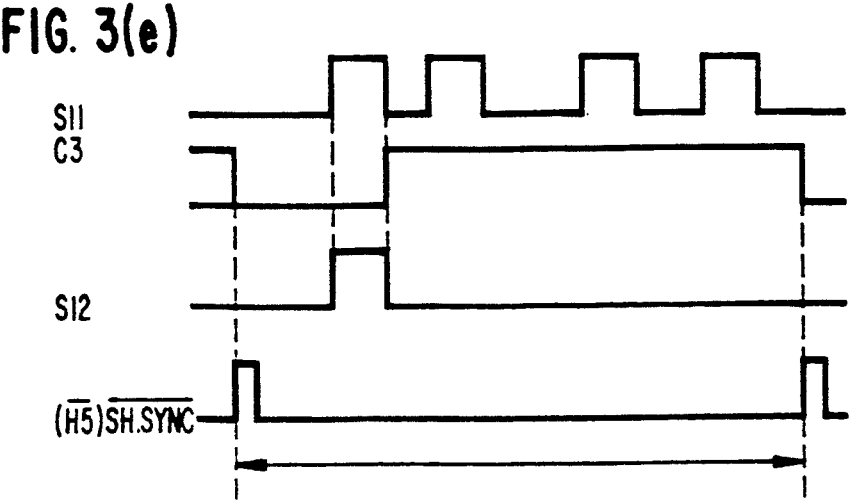
Figure 3F:
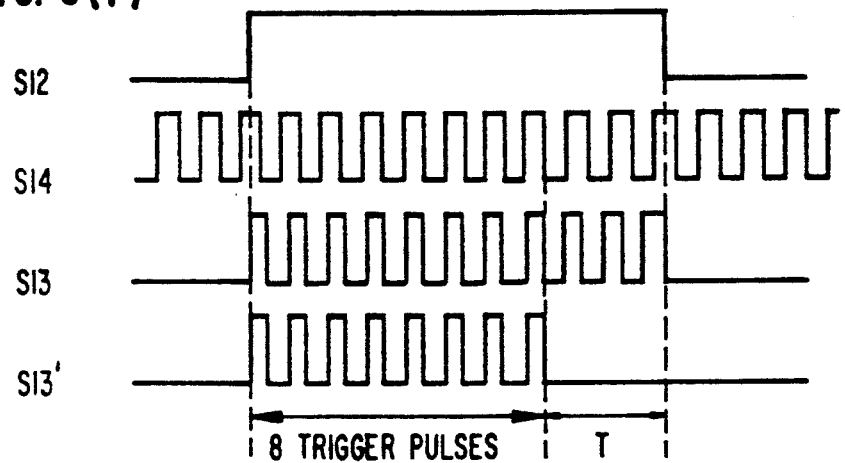
Figure 3G:
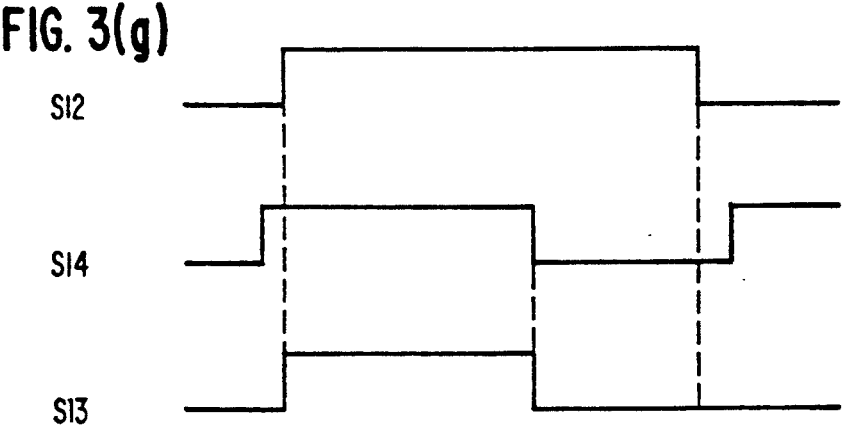

FIGS. 3a–3j illustrate signal diagrams for signals at designated points throughout the circuit in FIG. 2. FIG. 3a represents consecutive fields of the luminance signal Y in which an object has moved a distance A. The remaining signal diagrams will be explained hereafter in connection with FIG. 2.

In the circuit of the present invention as described above, when a vertical synchronizing signal VS (FIG. 3i) is supplied to the flip flop FF1 of the signal detecting circuit 101, a signal Q is supplied to the first switch 102 and the switches SW1,SW2 of the switching section 101-1 of the signal detecting circuit 101 in order to change the state of these switches. If the output signal Q of the flip flop FF1 is high, the input luminance signals Y are supplied to the analogue/digital converter 101-3 and converted into digital signals. Similarly, when signal Q from flip flop FF1 is low, the luminance signals Y are supplied to converter 101-2. Thus, the fields of the luminance signal are alternately supplied to converters 101-2 and 101-3. The luminance signals Y which are converted to digital signals are supplied to the delays 101-4, 101-5 of the signal detecting circuit 101 to be delayed by 1H (one horizontal sync period). Then the delayed luminance signals are converted back to analogue signals by the digital/analogue converters 101-6,101-7 of the signal detecting circuit 101. The luminance signals which are converted to analogue signals are supplied to the adders 101-8,101-9 of the signal detecting circuit 101, each of which outputs a difference between the input original luminance signal and the corresponding delayed luminance signal.

When signal Q is high, the switch SW1 of the switching section 101 is connected to a terminal H, and therefore, the inputted original luminance signals Y are outputted from the adder 101-8 of the signal detecting circuit 101.

Output signals S7,S8 (FIG. 3b) from the adders 101-8,101-9 of the signal detecting circuit 101 are alternately supplied to the first switch 102. Thus, when flip flop FF1 is high the first switch 102 is connected to the terminal H, and the output signal S7 is output from the adder 101-8. When next vertical synchronizing signal occurs, the switches SW1,SW2 and the first switch 102 change states and are connected to a terminal L, so that the output signal S8 of the adder 101-9 will be selected by the first switch 102.

Signal S9 which passes through the first switch 102 is amplified by the amplifier AMP1 of the signal shaping circuit 103, and the signal S10 (FIG. 3c) thus amplified is supplied to the shaping section 103-1. When the amplified signal S10 is negative, the transistor TR1 of the shaping section 103-1 is turned on and signal S11 (FIG. 3d) is output. When the amplified signal S10 is positive, the transistor TR2 of the shaping section 103-1 is turned on and signal S11 (FIG. 3d) is again output. The output signals in the above described manner are supplied through the second switch 105 to a terminal H of the AND gate AD1 of the combining circuit 107.

However, if the number of the objects to be photographed is plural, then signal S11 will include multiple pulses (FIG. 3e) per horizontal sync period. To ensure a single signal S12 is created per HS period a horizontal synchronizing signal HS (FIG. 3e) is input into the flip flop FF2 of the switching control circuit 104 in order to prevent the passing of a plurality of signals S12 (FIG. 3e) through switch 105. When signal S12 delivers a first pulse to FF2, signal C3 (FIG. 3e) changes switch 105 from a low state, in which signal S12 equals signal S11, to a high state, in which signal S12 equals ground. Consequently, only one pulse among the output signals of the shaping circuit 103 is permitted to pass through AND gate AD1 in accordance with the output signal of the flip flop FF2.

Meanwhile, the output frequency from the oscillator 106-1 of the pulse generating circuit 106 is subjected to a frequency division by the frequency dividers 106-2,106-3,106-4 of the pulse generating circuit 106, while the frequency-divided signals are selected by the switch SW3 based upon a control signal (not shown) from the microprocessor. By controlling the function of the switch SW3, the shutter speed can be fast for fast moving objects to be photographed or slow for slow moving objects. The microprocessor varies switch SW3 based upon output signals C0-C2.

The maximum number of the pulses of the output signals S13 (FIG. 3f) from the AND gate AD1 of the combining circuit 107 to be passed through switch SW4 is 8 per interval that signal S12 remains high. However, if the output frequency from the pulse generating circuit 106 is very low (as in FIG. 3g), and if the motion of the object is very fast, the number of the output pulses S13 from the AND gate AD1 is reduced to less than 8, since there are too few pulses in signal S14 per pulse in signal S12. Therefore, the microprocessor adjusts control in such a manner that the frequency of the signal S14 is increased by the switch SW3 of the pulse generating circuit 106.

On the other hand, if the frequency is set to be too high relative to the motions of the object to be photographed (as in FIG. 3f), the signal S12 is deprived of the information on the motion of the object, since signal S13 commonly contain the first 8 pulses in signal S13. Therefore, the switch SW3 is controlled to lower the frequency of the signal S14. That is, an adjustment is made by the microprocessor through the switch SW3 in such a manner as to equalize the signals S12 and the signals S14, so that the range of the shutter speed is varied relative to the motion of the object.

Figure 3H:
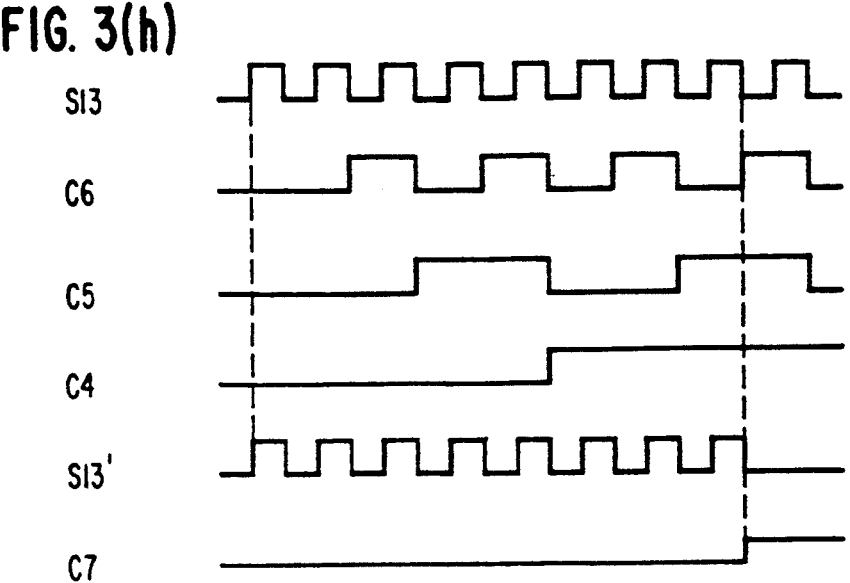

The output signal S13 from the pulse generating means 100 takes the form of a 3-bit control signal C0-C2 (in the pulse output means) which variables in correspondence with the speed of the motion of the object, and signal S13 forms 8 trigger pulses per field. Therefore, in order to remove the 9th input pulse, the output signal S13 of the combining circuit 107 is clocked by the flip flops FF3-FF5 of the signal processing circuit 201. When all of the output signals of the flip flops FF3-FF5 are high, high signals are outputted from the AND gate AD2 of the signal processing circuit 201. That is, if high signals are outputted from the AND gate AD2, 8 trigger pulses are detected by the signals S13. During the detection of the 8 trigger pulses, signal C7 is low and the switch SW4 of the signal processing circuit 201 is connected to the terminal L, so that the signal S13 is supplied to the error correcting circuit 202. After the outputting of the 8 trigger pulses, signal C7 (FIG. 3h) goes high and the switch SW4 is connected to a terminal H, with the result that the input pulses after the 8th pulse are all removed. Thus, the signal S13' of FIG. 3h is outputted.

The output signal S13' through the switch SW4 of the signal processing circuit 201 is supplied to the delayer 202-1 of the error correcting circuit, and is delayed by one field after being supplied to the delayer 202-1. That is, the signals of the current field S13' and the signals delayed by one field S15 (FIG. 3i) are supplied to the adder 202-2 of the error correcting circuit 202, and difference signals S16 (FIG. 3i) are outputted therefrom, while the output signals therefrom are supplied to the shaper 202-3.

Figure 3I:
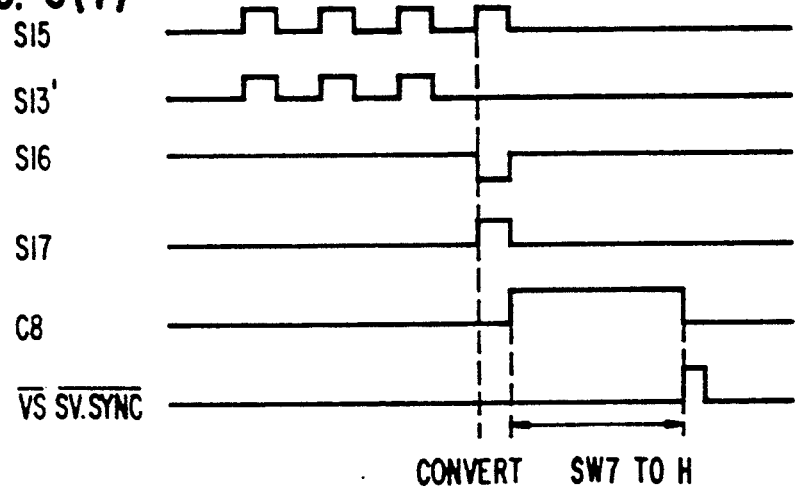
Figure 3J:
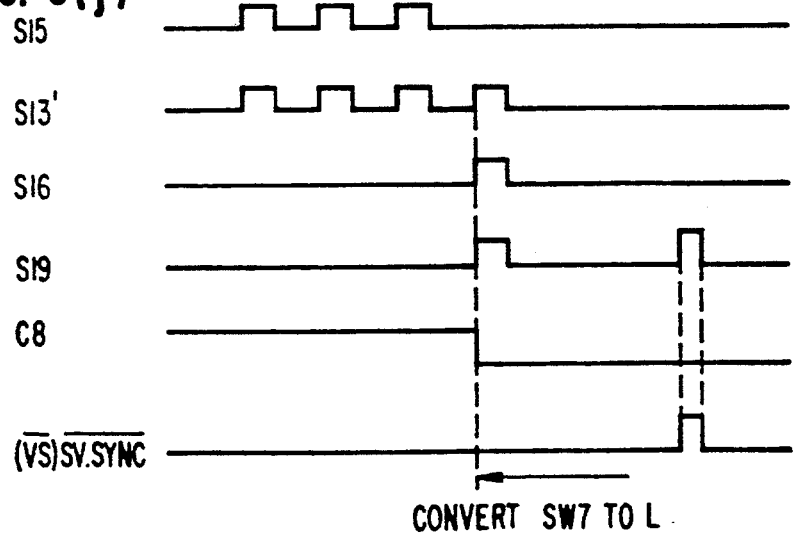

Under this condition, if the number of the trigger pulses of the output signals S15 from the delayer 202-1 is larger than the number of the trigger pulses of the output signals S13' from the signal processing circuit 201 (as illustrated in FIG. 3i), then a negative signal is output from the adder 202-2 in order to turn on the transistor TR3 of the shaper 202-3. Consequently, the signal S17 of FIG. 3i is outputted from the shaper 202-3. The signal S17 is delayed by the flip flop FF6, and then, is supplied to the third switch 203, so that the third switch 203 is connected to the terminal H when signal C8 turns high.

On the other hand, if the number of the trigger pulses of the output signals S15 from the delayer 202-1 is smaller than the number of the trigger pulses of the output signals S13' through the switch SW4 of the signal processing circuit 201 (as illustrated in FIG. 3i), then the output signal S16 from the adder 202-2 is positive, and this positive signal is supplied to the transistor TR4 of the shaper 202-3 in order to turn on the transistor TR4. Upon turning on the transistor TR4, the third switch 203 is switched over to the terminal L. Then the horizontal synchronizing signals are continuously compared within the input vertical synchronizing signals VS, and the signal S13' representing the motions of the object to be photographed is outputted. As the signals S13' move downward to correspond to the lower portion of the moving object, the number of the trigger pulses can be decreased, and such a decrease in the number of the trigger pulses can distort the signals S13' which represent the motion of the object. Therefore, during the inputting of one field of the vertical synchronizing signal (as illustrated on line VS of FIGS. 3i and 3j), the maximum value of the control signal C0-C2 of the moving object is selected by adjusting switch SW7 between terminals H and L, so that the signals C0-C2 are provided in order to control the shutter speed.

The difference between the signal S15 of the delayer 202-1 and the signal S13' of the switch SW4 of the signal processing circuit 201 is corrected by the OR gate OR1 of the error correcting circuit 202.

Meanwhile, the input vertical synchronizing signal VS is delayed by the flip flop FF7, and this delayed signal causes the fourth switch 301 to be switched over. That is, if the flip flop FF7 outputs a high signal, the fourth switch 301 is connected to the terminal H by the signal C10. Then, the output signals through the fourth switch 301 cause the flip flops FF8-FF10 of the control signal generating circuit 302 to be driven. Then the control signals C0-C2 are altered by the driven flip flops FF8-FF10. For example, if the signal S13' consists of three pulses, the output signals Q8,Q9,Q10 become 1, 1, and 0, respectively. If the signals S13' consists of 8 pulses, the output signals Q8,Q9,Q10 are shifted to 1, 1, and 1 respectively. That is, the shutter control speed is shifted to a low speed. Meanwhile, the output signals of the flip flops FF8-FF10 pass through the switches SW5-SW7. Under this condition, the output signal C11 of the inverter gate INV causes the switches SW5-SW7 to be connected to the terminal L.

If the fourth switch 301 is switched over to the terminal L by the output signal C10 of the flip flop FF7, then the flip flops FF11-FF13 of the control signal generating circuit 302 are driven, and the output signals Q11-Q13 of the flip flops FF11-FF13 cause the control signals C0-C2 to be outputted. Under this condition, the output signals of the flip flops FF11-FF13 are outputted through the terminal H of the switches SW5-SW7, and the shutter control speed is shifted to a high speed.

According to the present invention as described above, the luminance components among the input video signals are detected in order to generate signals in accordance with the motions of the object to be photographed, and the widths of the signals are varied in accordance with the shape of the generated signals. Then control signals for controlling the shutter speed are generated in accordance with the variation of the widths of the signals, so that the shutter speed should be automatically controlled in accordance with the motions of the object to be photographed.

That is, the shutter speed is automatically adjusted in accordance with the motions of the object, in such a manner that, if the object moves fast, the shutter speed is also adjusted to be fast, and, if the object moves slow, the shutter speed is also adjusted to be slow. Thus the image pickup is carried out as if the object moves at a constant speed, thereby maximizing the image pickup efficiency.

What is claimed is:

1. An automatic shutter speed control circuit for a video camera including a microprocessor for controlling a shutter speed, said video camera being of the type that photographs moving and still objects, said circuit comprising:

pulse generating means for generating control pulses in order to automatically control the shutter speed after detecting a speed of a moving object based upon luminance signals and horizontal synchronizing signals;

pulse processing means connected to an output of said pulse generating means, for generating pulse generated signals once per period of a vertical synchronizing signal, and for correcting errors of the generated control pulses; and signal outputting means, connected to an output of said pulse processing means, for generating shutter speed control signals to control the shutter speed based upon the generated control pulses.

2. The circuit as claimed in claim 1, wherein said pulse generating means comprises:

a signal detecting circuit for detecting the speed of a moving object based on a difference between consecutive input luminance signals:

a first switch for selecting one of at least two signals output from said signal detecting circuit;

a shaping circuit for amplifying and shaping the output signal selected by said first switch;

a switching control circuit and a second switch controlled to output shaped selected signals from said signal shaping circuit during the period of an input horizontal synchronizing signal representing the input luminance signals;

a pulse generating circuit for generating pulses in order to control the shutter speed; and a combining circuit for combining the pulses of said pulse generating circuit and the signals output by said second switch, to generate control pulses in order to control the shutter speed.

3. The circuit as claimed in claim 1, wherein said pulse processing means comprises:

a signal processing circuit for removing extraneous pulses from the generated control pulses that do not represent shutter speed control pulses to provide pulse generated signals;

an error correcting circuit for selecting and outputting a maximum value of the pulse generated signals during a period of a vertical synchronizing signal, when said error correction circuit identifies a non-correspondence between the pulse generated signals and delayed pulse generated signals; and a third switch for outputting the pulse generated signals based on a signal from said error correction circuit.

4. The circuit as claimed in claim 3, wherein said signal outputting means comprises:

a fourth switch for passing the output signals of said third switch, which represent the the object's motion; and a control signal generating circuit for receiving the output from said fourth circuit and a vertical synchronizing signal and for generating shutter speed control signals during a period when the vertical synchronizing signal is received, in order to control the shutter speed.

5. A method for automatically controlling a shutter speed for a video camera including a microprocessor, said camera being of the type that photographs moving and still objects, said method comprising the steps of:

generating input control pulses in order to automatically control the shutter speed after detecting a speed of a moving object based upon input luminance signals and horizontal synchronizing signals;

pulse processing the input control pulses by generating pulse generated signals once per period of a vertical synchronizing signal based on the input control pulses, and correcting errors in the input control pulses; and receiving the pulse generated signals and generating shutter speed control signals to control the shutter speed based upon the input control pulses.

6. The control method as claimed in claim 5, wherein said input control pulse generating step comprises the steps of:

detecting the speed of a moving object based on a difference between consecutive input luminance signals and outputting a corresponding signal;

selecting one of at least two output signals from said speed detecting step;

amplifying and shaping output signals of said speed detecting and selecting steps;

control switching to output the amplified and shaped signals only during a period of an input horizontal synchronizing signal;

generating pulses, via a pulse generating circuit, for controlling the shutter speed; and combining and outputting the signals resulting from said pulse generating step and said control switching step, in order to control the shutter speed.

7. The control method as claimed in claim 5, wherein said pulse processing step comprises the steps of:

removing extraneous pulses from the input control pulses that do not represent shutter speed control pulses to provide pulse generated signals;

error correcting by selecting and outputting a maximum value of the pulse generated signals during a period of a vertical synchronizing signal upon identifying a non-correspondence between the pulse generated signals and delayed pulse generated signals; and control switching to output the pulse generated signals based on the maximum value output in said error correcting step.

8. The control method as claimed in claim 5, wherein said receiving and generating step comprises the steps of:

control switching to output signals representing an object's motion based on the received pulse generated signals; and generating the shutter speed control signals and receiving a vertical synchronizing signal, and outputting the shutter speed control signals during a period when the vertical synchronizing signal is received.

9. An automatic shutter speed control circuit for a video camera including a microprocessor for controlling a shutter speed, the video camera being of the type that photographs moving and still objects, said circuit comprising:

pulse generating circuitry that generates control pulses in order to automatically control the shutter speed after detecting a speed of a moving object based upon luminance signals and horizontal synchronizing signals;

pulse processing circuitry connected to an output of said pulse generating circuitry, which generates pulse generated signals once per period of a vertical synchronizing signal, and which corrects errors of the generated control pulses; and signal outputting circuitry, connected to an output of said pulse processing circuitry, which generates shutter speed control signals to control the shutter speed based upon the generated control pulses.

* * * * *